Dec. 7, 1937.  G. A. TINNERMAN  2,101,287
FASTENING DEVICE
Filed July 15, 1937

INVENTOR.
GEORGE A. TINNERMAN
BY Bates, Goldrick, & Teare
ATTORNEYS

Patented Dec. 7, 1937

2,101,287

UNITED STATES PATENT OFFICE 2,101,287

FASTENING DEVICE

George A. Tinnerman, Rocky River, Ohio, assignor to Albert H. Tinnerman, Cleveland, Ohio Application July 15, 1937, Serial No. 153,756

7 Claims. (Cl. 109—36)

This invention relates to devices for fastening together superimposed parts, such as sheet metal members, and particularly to threadless fasteners which have a portion deformed therefrom for engaging the shank of a threaded member.

Where it is desired to use a fastener in a blind location, that is, where an operator cannot readily hold a nut while he is inserting a bolt into it, it has been necessary to utilize some extraneous means, such as rivets or other fastening means, for holding the fasteners in place. There are many instances, particularly in automotive production, where fasteners are desirable, but where it is impractical to hold them in a satisfactory manner by any means heretofore employed. An example of such use is the attachment of the fender to the body of a motor vehicle. A further example of such use is in the assembly of a household refrigerator door assembly, although there are many other examples which could be cited.

An object of the present invention is to construct a sheet metal fastener in such manner that, when it is applied to a part having a bolt receiving aperture, and in a blind location, it will automatically center itself with respect to the bolt opening in such part, and will automatically lock itself in bolt-receiving position, thereby enabling the bolt to be inserted without requiring an operator to hold the fastener in any manner, while the bolt is being threaded onto the fastener.

Figure 1:
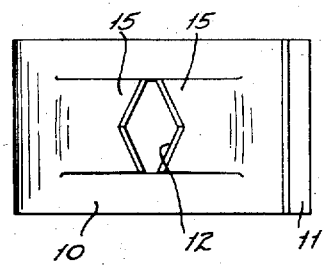
Figure 2:
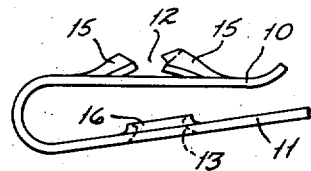
Figure 3:
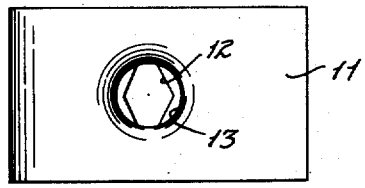
Figure 4:
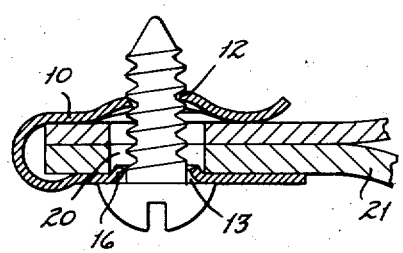
Figure 5:
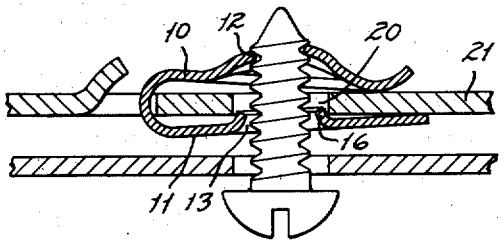

Referring now to the drawing, Fig. 1 is a top plan view of a fastener made in accordance with my invention; Fig. 2 is a side view of the fastener; Fig. 3 is a bottom view of it; Fig. 4 is a sectional view showing the fastener applied to a support and part, and Fig. 5 shows a section illustrating the fastener applied to a support through an assembling slot.

I have shown my invention in connection with a fastener that comprises a strip of sheet metal which is bent backwardly to provide two arms, one of which is indicated at 10 and the other of which is indicated at 11. These arms may be substantially equal in width and may be spaced apart a distance that corresponds to the thickness of the part with which the fastener is intended for use. The arm 10 has an aperture 12 therein for receiving a shank of a bolt or other fastener, while the arm 11 has an aperture 13 in registration with the opening 12 through which the shank of the fastener 14 may extend. The opening 13 is adapted to clear the shank of the bolt but that part of the arm 10 adjacent the opening 12 is deformed as at 15 so as to engage a bolt thread. I am not concerned in this application with the particular shape or configuration of the deformed portion 15, for the present invention is applicable to sheet metal fasteners, regardless of the construction of the deformed thread engaging portions.

The present invention enables a sheet metal fastener to be centered automatically in registration with the bolt opening in the part to be joined, and to be locked automatically to such part in bolt receiving position thereon. In the preferred embodiment this is accomplished by deforming a portion 16 of the arm 11 which is adjacent the bolt passageway 13 until it has a frustro-conical shape, the apex end of which extends above the plane of the arm 11 and in the same general direction as the deformed part 15. This construction thereby provides, in effect an indexing button, which fits into the opening 20 in the part 21, to which the fastener is applied, and inasmuch as the opening 12 is in registration with the opening 13, it follows that the fastener is thereby held automatically in bolt receiving position.

By making the distance between the arms 10 and 11 such that they must be spread slightly apart to admit the article 21, it is apparent that the frictional contact between the arms and the article serves additionally to hold the fastener in proper bolt receiving position. It is to be understood however that the present invention is not limited to a frustro-conical shape of the indexing portion, but that any projecting part adjacent the bolt aperture is to be included within the scope of my invention.

I claim:—

1. A fastener comprising a one-piece sheet metal strip having two arms disposed in superimposed relationship and extending in the same general direction, one of the arms having an aperture for receiving a threaded member and the other having a thread engaging portion that is formed therefrom and extends out of the plane thereof, the first named arm having that portion thereof surrounding the aperture also deformed out of the plane thereof for entering an aperture in a part to be joined, and thereby to lock the fastener in bolt receiving position on such part.

2. A fastener comprising a one-piece sheet metal device having two members, each having registering bolt receiving apertures therein, means adjacent one of the apertures for engaging the thread of a bolt and means adjacent the other aperture for clearing the bolt, but for entering an aperture in a part to be joined and for maintaining the apertures in the part and fastener in registration.

3. A fastener comprising a one piece sheet metal device having means deformed therefrom for engaging the thread of a bolt, said means being in registration in an opening in a part to be joined, and said fastener having other means thereon adapted to enter the bolt opening in said part for positioning the fastener upon the part and for holding it against movement with relation thereto while the bolt is being inserted therein, said last named means having a frustro-conical form and having a size sufficient to clear the bolt.

4. In securing parts, not accessible from both sides, the combination of a support readily accessible from one side only and provided with a bolt passage and an assembling slot, a part to be connected to said support and a one-piece connecting device comprising a pair of members, one of which is provided with bolt-receiving means deformed therefrom, and is applicable through the assembling slot from the accessible side of the support to be positioned on the opposite side thereof with the bolt-receiving means overlying the bolt passage, and in position to receive a bolt fastening to connect said parts to the support and the other of said members having means deformed therefrom for entering the bolt passage in said support, whereby the fastener may be held in locked position on said support.

5. In securing parts not accessible from both sides, the combination of a support readily accessible from one side only and provided with a bolt passage and an assembling slot, a part to be connected to said support, and a one-piece connecting device comprising a plurality of integral members, one of which is provided with integral bolt-receiving means formed therefrom and is applicable through the assembling slot from the accessible side of the support to be positioned on opposite side thereof with the bolt-receiving means overlying the bolt passage to receive a bolt fastening to connect said part to the support, said member provided with bolt-receiving means being of such size as to completely cover the bolt passage, to prevent the bolt-receiving means from being pulled therethrough when the bolt fastening is drawn up, and the other member being provided with means for entering the bolt passage in the support to lock the fastener in bolt-receiving position thereon.

6. In securing parts not accessible from both sides, the combination of a support readily accessible from one side only and provided with a bolt passage and an assembling slot, a part to be connected to said support, and a one-piece sheet-metal connecting device, comprising a pair of members, one of which is provided with integral bolt-receiving means deformed therefrom and is applicable through the assembling slot from the accessible side of the support to be positioned on the opposite side thereof to cooperate with the other of said members to maintain the device in position on the support with the bolt-receiving means overlying the bolt passage for receiving the bolt fastening to connect said parts to the support, said bolt passage in the support being completely covered by the member provided with the bolt-receiving means to prevent the same from being pulled through the bolt passage when the bolt fastening is drawn up, and said other member having means deformed therefrom and extending in the same general direction as the bolt-engaging means for entering the bolt passage in the support, and for automatically locking the fastener in bolt-receiving position upon the support, before the bolt is applied thereto.

7. In securing parts accessible from one edge only, the combination of a support having a bolt-passage extending therethrough, a part to be connected to said support and having a bolt-passage in registration with that in the support, and a U-shaped clip having two arms adapted to engage the support and part respectively, each arm having a bolt opening therein in registration with the bolt passage in the support and part respectively, one of the arms having bolt-receiving means deformed therefrom and the other arm having a frustro-conical portion deformed therefrom for entering the bolt passage in the support, whereby the fastener is automatically locked in bolt-receiving position upon the support whenever it is applied to the support.

GEORGE A. TINNERMAN.

CERTIFICATE OF CORRECTION.

Patent No. 2,101,287.     December 7, 1937.

GEORGE A. TINNERMAN.

It is hereby certified that error appears in the above numbered patent requiring correction as follows: In the heading to the printed specification, line 7 thereof, for "(Cl. 109-36)" read (Cl. 189-36); and that the said Letters Patent should be read with this correction therein that the same may conform to the record of the case in the Patent Office.

Signed and sealed this 5th day of September, A. D. 1939.

Henry Van Arsdale, (Seal)     Acting Commissioner of Patents.

taining the apertures in the part and fastener in registration.

3. A fastener comprising a one piece sheet metal device having means deformed therefrom for engaging the thread of a bolt, said means being in registration in an opening in a part to be joined, and said fastener having other means thereon adapted to enter the bolt opening in said part for positioning the fastener upon the part and for holding it against movement with relation thereto while the bolt is being inserted therein, said last named means having a frustro-conical form and having a size sufficient to clear the bolt.

4. In securing parts, not accessible from both sides, the combination of a support readily accessible from one side only and provided with a bolt passage and an assembling slot, a part to be connected to said support and a one-piece connecting device comprising a pair of members, one of which is provided with bolt-receiving means deformed therefrom, and is applicable through the assembling slot from the accessible side of the support to be positioned on the opposite side thereof with the bolt-receiving means overlying the bolt passage, and in position to receive a bolt fastening to connect said parts to the support and the other of said members having means deformed therefrom for entering the bolt passage in said support, whereby the fastener may be held in locked position on said support.

5. In securing parts not accessible from both sides, the combination of a support readily accessible from one side only and provided with a bolt passage and an assembling slot, a part to be connected to said support, and a one-piece connecting device comprising a plurality of integral members, one of which is provided with integral bolt-receiving means formed therefrom and is applicable through the assembling slot from the accessible side of the support to be positioned on opposite side thereof with the bolt-receiving means overlying the bolt passage to receive a bolt fastening to connect said part to the support, said member provided with bolt-receiving means being of such size as to completely cover the bolt passage, to prevent the bolt-receiving means from being pulled therethrough when the bolt fastening is drawn up, and the other member being provided with means for entering the bolt passage in the support to lock the fastener in bolt-receiving position thereon.

6. In securing parts not accessible from both sides, the combination of a support readily accessible from one side only and provided with a bolt passage and an assembling slot, a part to be connected to said support, and a one-piece sheet-metal connecting device, comprising a pair of members, one of which is provided with integral bolt-receiving means deformed therefrom and is applicable through the assembling slot from the accessible side of the support to be positioned on the opposite side thereof to cooperate with the other of said members to maintain the device in position on the support with the bolt-receiving means overlying the bolt passage for receiving the bolt fastening to connect said parts to the support, said bolt passage in the support being completely covered by the member provided with the bolt-receiving means to prevent the same from being pulled through the bolt passage when the bolt fastening is drawn up, and said other member having means deformed therefrom and extending in the same general direction as the bolt-engaging means for entering the bolt passage in the support, and for automatically locking the fastener in bolt-receiving position upon the support, before the bolt is applied thereto.

7. In securing parts accessible from one edge only, the combination of a support having a bolt-passage extending therethrough, a part to be connected to said support and having a bolt-passage in registration with that in the support, and a U-shaped clip having two arms adapted to engage the support and part respectively, each arm having a bolt opening therein in registration with the bolt passage in the support and part respectively, one of the arms having bolt-receiving means deformed therefrom and the other arm having a frustro-conical portion deformed therefrom for entering the bolt passage in the support, whereby the fastener is automatically locked in bolt-receiving position upon the support whenever it is applied to the support.

GEORGE A. TINNERMAN.

CERTIFICATE OF CORRECTION.

Patent No. 2,101,287.     December 7, 1937.

GEORGE A. TINNERMAN.

It is hereby certified that error appears in the above numbered patent requiring correction as follows: In the heading to the printed specification, line 7 thereof, for "(Cl. 109-36)" read (Cl. 189-36); and that the said Letters Patent should be read with this correction therein that the same may conform to the record of the case in the Patent Office.

Signed and sealed this 5th day of September, A. D. 1939.

Henry Van Arsdale, (Seal)     Acting Commissioner of Patents.

CERTIFICATE OF CORRECTION.

Patent No. 2,101,287.  December 7, 1937.

GEORGE A. TINNERMAN.

It is hereby certified that error appears in the above numbered patent requiring correction as follows: In the heading to the printed specification, line 7 thereof, for "(Cl. 109-36)" read (Cl. 189-36); and that the said Letters Patent should be read with this correction therein that the same may conform to the record of the case in the Patent Office.

Signed and sealed this 5th day of September, A. D. 1939.

Henry Van Arsdale, (Seal)  Acting Commissioner of Patents.